United States Patent
Xu et al.

(10) Patent No.: US 9,059,912 B2
(45) Date of Patent: Jun. 16, 2015

(54) TRAFFIC POLICING FOR MPLS-BASED NETWORK

(75) Inventors: Fengman Xu, Allen, TX (US); William F. Copeland, Garland, TX (US); Khalid M. Elshatali, Allen, TX (US); Luis M. Tomotaki, Allen, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 142 days.

(21) Appl. No.: 13/405,648

(22) Filed: Feb. 27, 2012

(65) Prior Publication Data

US 2013/0223221 A1    Aug. 29, 2013

(51) Int. Cl.
*H04L 12/24*     (2006.01)
*H04L 12/26*     (2006.01)
*H04L 12/723*    (2013.01)
*H04L 12/721*    (2013.01)

(52) U.S. Cl.
CPC ......... *H04L 43/0876* (2013.01); *H04L 41/0213* (2013.01); *H04L 45/38* (2013.01); *H04L 45/50* (2013.01)

(58) Field of Classification Search
CPC ....................................................... H04L 45/50
See application file for complete search history.

(56) References Cited

U.S. PATENT DOCUMENTS

| | | | |
|---|---|---|---|
| 2003/0235209 A1* | 12/2003 | Garg et al. | 370/468 |
| 2010/0043068 A1* | 2/2010 | Varadhan et al. | 726/15 |
| 2010/0322072 A1* | 12/2010 | Fujihira et al. | 370/230 |
| 2011/0032942 A1* | 2/2011 | Matthews et al. | 370/392 |
| 2012/0269195 A1* | 10/2012 | Adamczyk et al. | 370/389 |
| 2013/0279520 A1* | 10/2013 | Figueira | 370/468 |

* cited by examiner

*Primary Examiner* — Huy D Vu
*Assistant Examiner* — Teisha D Hall

(57) ABSTRACT

A method, a device, and a storage medium provide for storing traffic policies pertaining to egress traffic to a network; receiving a traffic flow; computing a route for the traffic flow; identifying at least one of one or more labels associated with the traffic flow or a network address associated with a remote provider edge device associated with the traffic flow; selecting one or more traffic policies in response to at least one of an identification of the one or more labels or an identification of the network address; and transmitting along the route in the network according to the one or more traffic policies.

21 Claims, 15 Drawing Sheets

TRAFFIC POLICING FOR MPLS-BASED NETWORK

BACKGROUND

In Multiprotocol Label Switching (MPLS)-based networks, such as MPLS-based Virtual Private Networks (VPNs), various architectures may be implemented to provide traffic policing at ingress interfaces.

DETAILED DESCRIPTION

Figure 1:
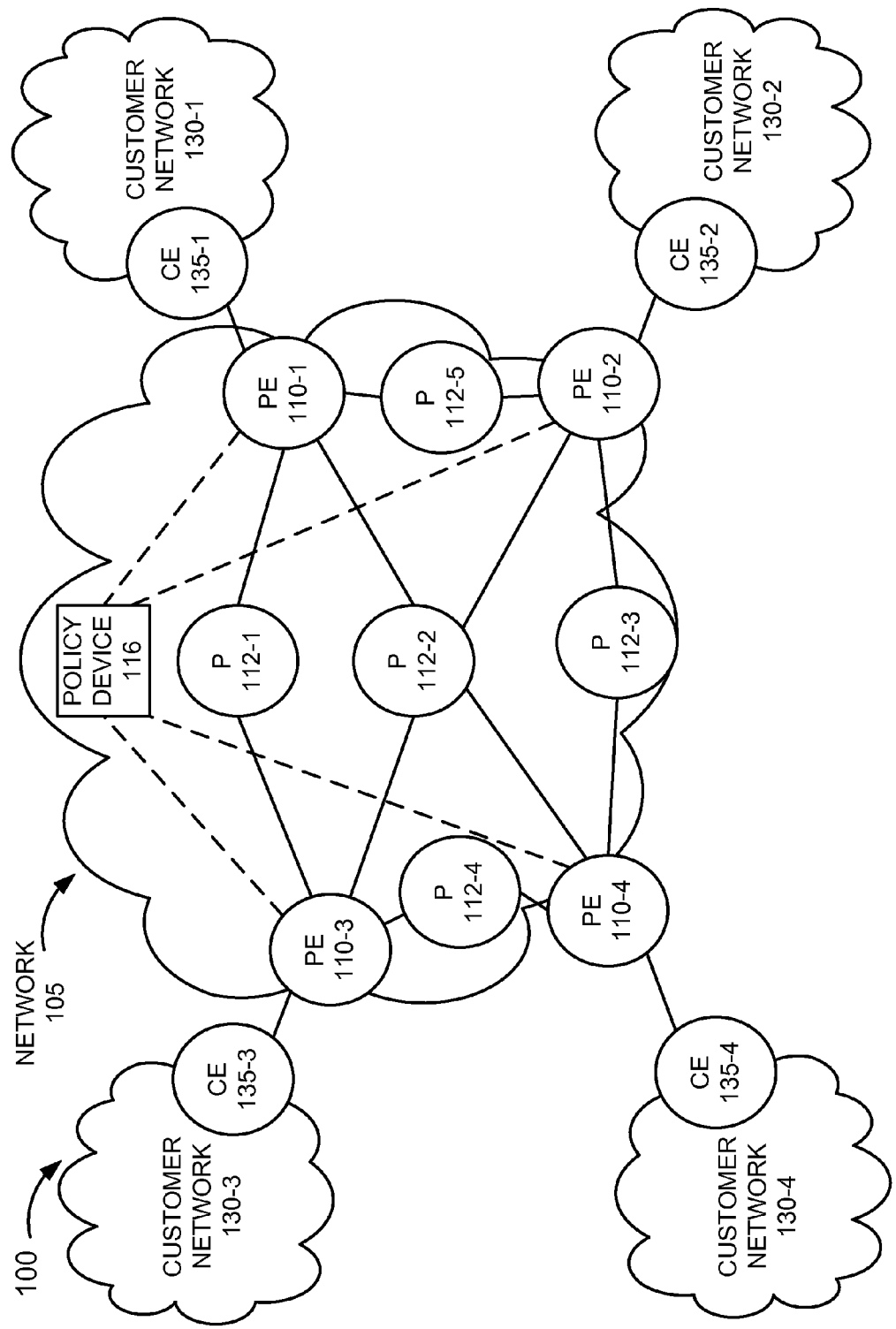
FIG. 1 is a diagram illustrating an exemplary environment in which an exemplary embodiment of an MPLS-based network with traffic policing may be implemented.

The following detailed description refers to the accompanying drawings. The same reference numbers in different drawings may identify the same or similar elements.

Currently, traffic policing is focused upon ingress interfaces of routing devices by using Quality of Service (QoS), customer Internet Protocol (IP) address, or protocol information in the IP header, such as explained in Request For Comment (RFC) 2990. According to an exemplary embodiment, traffic policing is extended to nodes in an MPLS-based network. For example, according to an exemplary embodiment, an MPLS-based network uses MPLS labels (e.g., VPN labels, Network labels, a combination thereof, etc.) and/or network address(es) (e.g., next-hop address, destination address, remote provider edge device address, etc.) for managing traffic policies. According to an exemplary implementation, nodes in an MPLS-based network (e.g., provider edge devices) store a data structure or a database that allow the nodes to correlate MPLS labels and/or network addresses with traffic policies. For example, the nodes store a Label Forwarding Information Base (LFIB) that allows the nodes to enforce the traffic policies. The traffic policies may be applied to selected VPN traffic, a group of VPN traffic, all traffic traversing a node, etc. The traffic policies applied to traffic may include 2-rate 3-color (2R3C) policing, 1R2C policing, simple rate limiting, traffic or packet dropping, and/or other well-known policing practices (e.g., described in RFCs 2697, 2698, 4115, etc).

According to an exemplary embodiment, nodes (e.g., provider edge devices) in an MPLS-based network include VPN queues to store traffic. For example, the VPN queues may be used for traffic pertaining to particular VPNs. According to an exemplary embodiment, nodes in the MPLS-based network include VPN group queues and/or other hierarchical queues (e.g., an all-traffic queue, a portion of all-traffic queue, etc.) to store traffic. The nodes may also include port-level queues, which are known to be used in provider edge routers and/or other types of MPLS-based devices. A queue may be implemented in a cascaded manner (e.g., hierarchical fashion) or in a multilayer manner (e.g., the queue acts independently relative to other queues).

According to an exemplary embodiment, nodes in an MPLS-based network (e.g., provider edge devices) examine the active traffic bandwidth (e.g., bits per second) destined to destination nodes. According to an exemplary embodiment, the nodes send the active traffic bandwidth information to a policy node. According to an exemplary embodiment, the policy node accumulates the traffic bandwidth information, analyzes this information, and generates policy information. Policy node sends the policy information to the nodes. The policy information may be understood natively by the nodes for immediate deployment. Alternatively, in response to receiving the policy information, if the policy information is not understood natively by the nodes, the nodes may generate policy information in an appropriate syntax. According to an exemplary embodiment, the policy information includes policies pertaining to bandwidth. According to an exemplary embodiment, the policy information may be stored by the nodes in a data structure or a database. According to an exemplary implementation, the policy information is stored in an LFIB.

A label switching path or path, as described herein, may be a logical label switching path or a physical label switching path. For example, a label switching path may be a layer 2 path or a layer 3 path (e.g., Internet Protocol (IP), MPLS, Private Virtual Circuit (PVC), Pseudo wire (PW), etc.) between two nodes.

While implementations of exemplary embodiments described herein are described using a particular protocol, communication standard, platform, etc., such implementations are not intended to be restrictive or provide an exhaustive treatment, as such. In other words, the embodiments described herein may be implemented using other suitable protocols, communication standards, platforms, etc., which may not be specifically described. For example, one or more embodiments described herein may be practiced in a Provider Backbone Bridge Traffic Engineering (PBB-TE)-based network, a Generalized MPLS (GMPLS)-based network, or a Q-in-Q-based network. For example, other MPLS-equivalent labels, such as a generalized label associated with the GMPLS network, a virtual local area network (VLAN) tag associated with the Q-in-Q-based network, or a media access control (MAC) address associated with the PBB network may be used. By way of further example, the generalized label can represent a single fiber in a bundle, a single waveband within a fiber, a single wavelength within a waveband or a fiber, or a set of time-slots within a wavelength or a fiber. The generalized label may also carry a label that represents a generic MPLS label, a Frame Relay label, or an ATM label.

FIG. 1 is a diagram illustrating an exemplary environment in which an exemplary embodiment of an MPLS-based network with traffic policing may be implemented. As illustrated, environment 100 includes a network 105 that includes provider edge (PE) devices 110-1 through 110-4 (also referred to collectively as provider edge devices 110 and individually as provider edge device 110), provider (P) devices 112-1 through 112-5 (also referred to collectively as provider devices 112 and individually as provider device 112), and a policy device 116. Additionally, environment 100 includes customer networks 130-1 through 130-4 (also referred to collectively as customer networks 130 and individually as customer network 130) and customer edge (CE) devices 135-1 through 135-4 (also referred to collectively as customer edge devices 135 and customer edge device 135).

The number of devices and the configuration of devices and networks in environment 100 are exemplary and provided for simplicity. According to other embodiments, environment 100 may include additional devices, fewer devices, different devices, and/or differently arranged devices, than those illustrated in FIG. 1.

According to other embodiments, a single device shown in FIG. 1 may be implemented as multiple devices and/or multiple devices may be implemented as a single device. By way of example, policy device 116 may be implemented as multiple devices. A device may be implemented according to a centralized computing architecture, a distributed computing architecture, or a cloud computing architecture. Additionally, a device may be implemented according to one or multiple network architectures (e.g., a client device, a server device, a peer device, or a combination thereof).

Also, one or more functions and/or processes described as being performed by a particular device may be performed by a different device, or some combination of devices, which may or may not include the particular device.

Environment 100 may be implemented to include wired and/or wireless connections among the devices and the networks illustrated. A connection may be direct or indirect and may involve intermediary device(s) and/or network(s) not illustrated in FIG. 1. Additionally, the number and the arrangement of connections between the devices and the networks are exemplary and provided for simplicity.

Network 105 includes an MPLS network that provides, for example, pseudo wire (PW) services, virtual private local area network (VLAN) services, layer 2 MPLS virtual private network (VPN) services, and/or layer 3 MPLS VPN services. As described further below, network 105 provides traffic policy control to provider edge devices 110, an individual VPN, a group of VPNs, and/or a label switching path.

According to an exemplary implementation, network 105 includes label switching paths. For example, network 105 includes Label Distribution Protocol (LDP) label switching paths that do not have traffic engineering capabilities. According to another exemplary implementation, network 105 includes label switching paths that have traffic-engineering capabilities. For example, network 105 includes Resource Reservation Protocol (RSVP) or RSVP-Traffic Extension (RSVP-TE) label switching paths that support explicit paths and bandwidth reservation. According to yet another exemplary implementation, network 105 includes stacked label switching paths. For example, network 105 may include an LDP LSP that is stacked over an RSVP LSP or an RSVP-TE LSP. A session on a label switching path may be established among provider edge device(s) 110 and/or provider device(s) 112 that support the LDP and the use of tunneling via RSVP LSP(s) or RSVP-TE LSP(s).

Provider edge device 110 includes a network device that receives and transmits a traffic flow. Provider edge device 110 enforces traffic policies based on labels included in traffic and stored traffic policies, as described herein. According to an exemplary implementation, provider edge device 110 includes a router that routes traffic flows to and from customer network 130 via customer edge device 135 and routes traffic flows to and from provider devices 110. According to an exemplary implementation, provider edge device 110 performs labeling.

Provider device 112 includes a network device that receives and transmits a traffic flow. According to an exemplary implementation, provider device 112 is a core or a backbone router in network 105.

Policy device 116 includes a network device that stores traffic policies. Policy device 116 manages the policy information used or enforced by provider edge devices 110. According to an exemplary implementation, policy device 116 provides the policy information to provider edge devices 110 in response to traffic information received from provider edge devices 110. According to an exemplary implementation, policy device 116 includes a server device. According to another implementation, the functionality of policy device 116 may be implemented within one or more provider edge devices 110. According to yet another implementation, policy edge device 110 may be implemented as a network management device (e.g., a workstation, etc.). Policy device 116 may be implemented within network 105, as illustrated in FIG. 1, or outside of network 105.

Customer network 130 includes a network associated with a customer site. Customer edge device 135 includes a network device that receives and transmits a traffic flow to/from network 105. According to an exemplary implementation, customer edge device 135 includes a router that routes traffic flows to and from network 105 via provider edge device 110. According to an exemplary implementation, customer edge device 135 includes a layer 2 and a layer 3 service-aware device.

Figure 2A:
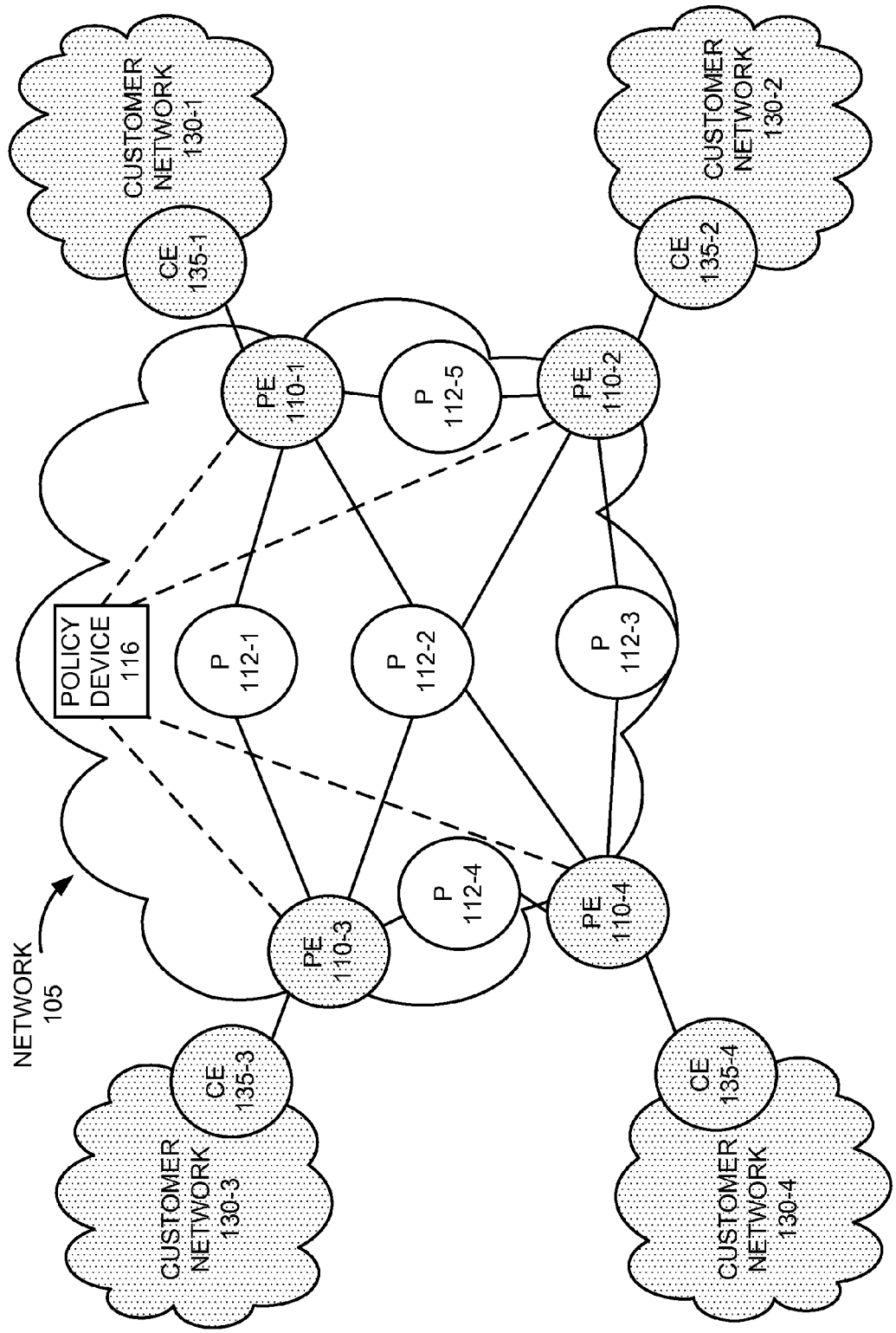
FIGS. 2A-2F are diagrams that illustrate an exemplary process pertaining to traffic policing in the MPLS-based network depicted in FIG. 1.

FIGS. 2A-2F illustrate an exemplary process pertaining to traffic policing in an MPLS network. Referring to FIG. 2A, it may be assumed that provider edge devices 110-1 through 110-4 receive traffic flows from customer networks 130-1 through 130-4 via customer edge devices 135-1 through 135-4, respectively, destined to a destination. The service provider may define a traffic flow relative to provider edge devices 110 based on data/information included in a packet.

Figure 3:
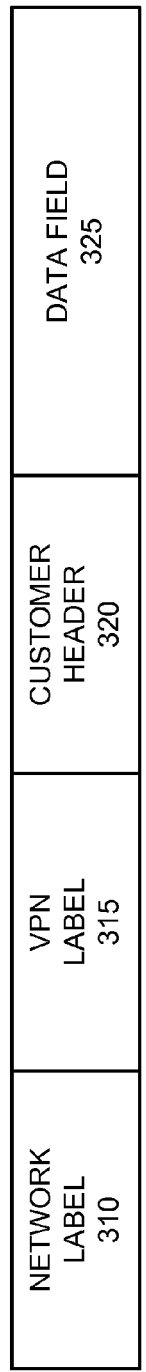
FIG. 3 is a diagram illustrating an exemplary packet format.

The term "packet," as used herein, is intended to be broadly interpreted to include a data transmission or communication, the packaging of which may correspond to, for example, a packet, a cell, a frame, a datagram, some other type of container or unit of data, and/or a fragment thereof. The packet may include or be modified to include a label or other suitable field(s) to comply with the communication standard associated with network 105 (e.g., an MPLS network). For example, referring to FIG. 3, a packet 305 may include a network label 310, a virtual private network (VPN) label 315, a customer header 320, and a data field 325. According to other implementations, packet 305 may include additional, fewer, and/or different field(s) or section(s).

Network label 310 includes an MPLS label (e.g., sometimes referred to as an outer label). For example, network label 310 may identify the segment(s) of a label switching path between an ingress provider edge device 110 and an egress provider edge device 110. Virtual private network label 315 includes a label to distinguish between VPNs (e.g., sometimes referred to as an inner label). For example, virtual private network label 315 may include forwarding information (e.g., an egress provider edge device's outgoing interface for the packet, a virtual circuit identifier, a quality of service value(s), etc.). Additionally, or alternatively, virtual private network label 315 may include, for example, an identifier (e.g., a string) that identifies a customer's VPN. Customer header 320 includes source and destination addresses (e.g., IP addresses), and data field 325 includes data. According to an exemplary implementation, provider edge device 110 may define a traffic flow based on packets that have the same network label 310, VPN label 315, customer header 320, and/or a portion of data/information included therein.

Figure 2B:
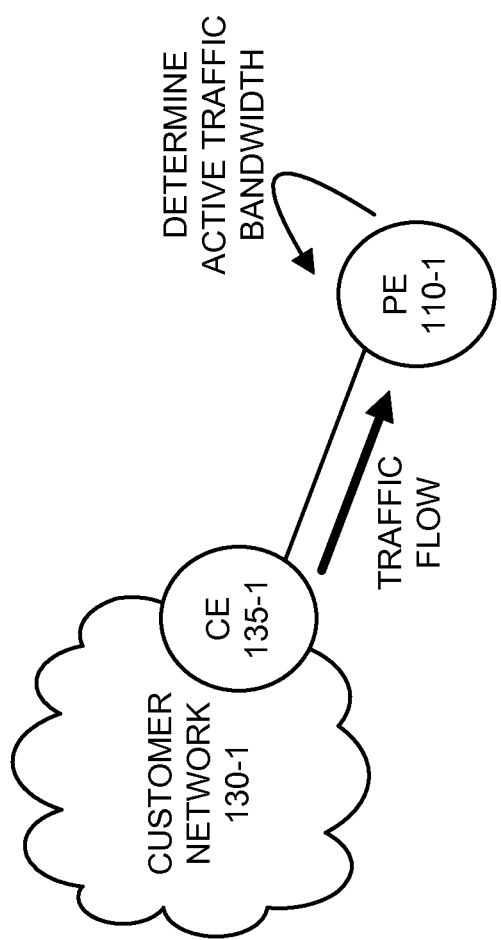

According to an exemplary embodiment, as illustrated in FIG. 2B, provider edge device 110-1 determines the active traffic bandwidth (e.g., the bandwidth being used) of a path to a destination node. Provider edge device 110-1 identifies the destination node based on a routing lookup. For example, a recursive lookup for a layer 3 VPN route yields a Border Gateway Protocol (BGP) next-hop node as the destination node. Alternatively, provider edge device 110-1 identifies the destination based on other well-known techniques. Provider edge device 110-1 routes the traffic flow to the destination and collects statistical information pertaining to the current traffic flow using a label switching path. The statistical information includes or allows provider edge device 110-1 to derive a current bandwidth utilization. By way of example, provider edge device 110-1 samples for a time period (e.g., t0 to t1) the number of bits or bytes transmitted via one or more interfaces. The network operator associated with network 105 may set one or multiple time periods to measure the bandwidth (e.g., 1 minute, 5 minutes, etc.). Alternatively, provider edge device 110 determines the active traffic bandwidth associated with a destination based on other well-known techniques to identify bandwidth usage. For example, provider edge device 110-1 may determine the active bandwidth based on the customer's provisioned bandwidth and/or the uplink bandwidth of provider edge device 110-1. Although not illustrated, in a similar manner, provider edge devices 110-2, 110-3, and 110-4, perform a similar process.

Figure 2C:
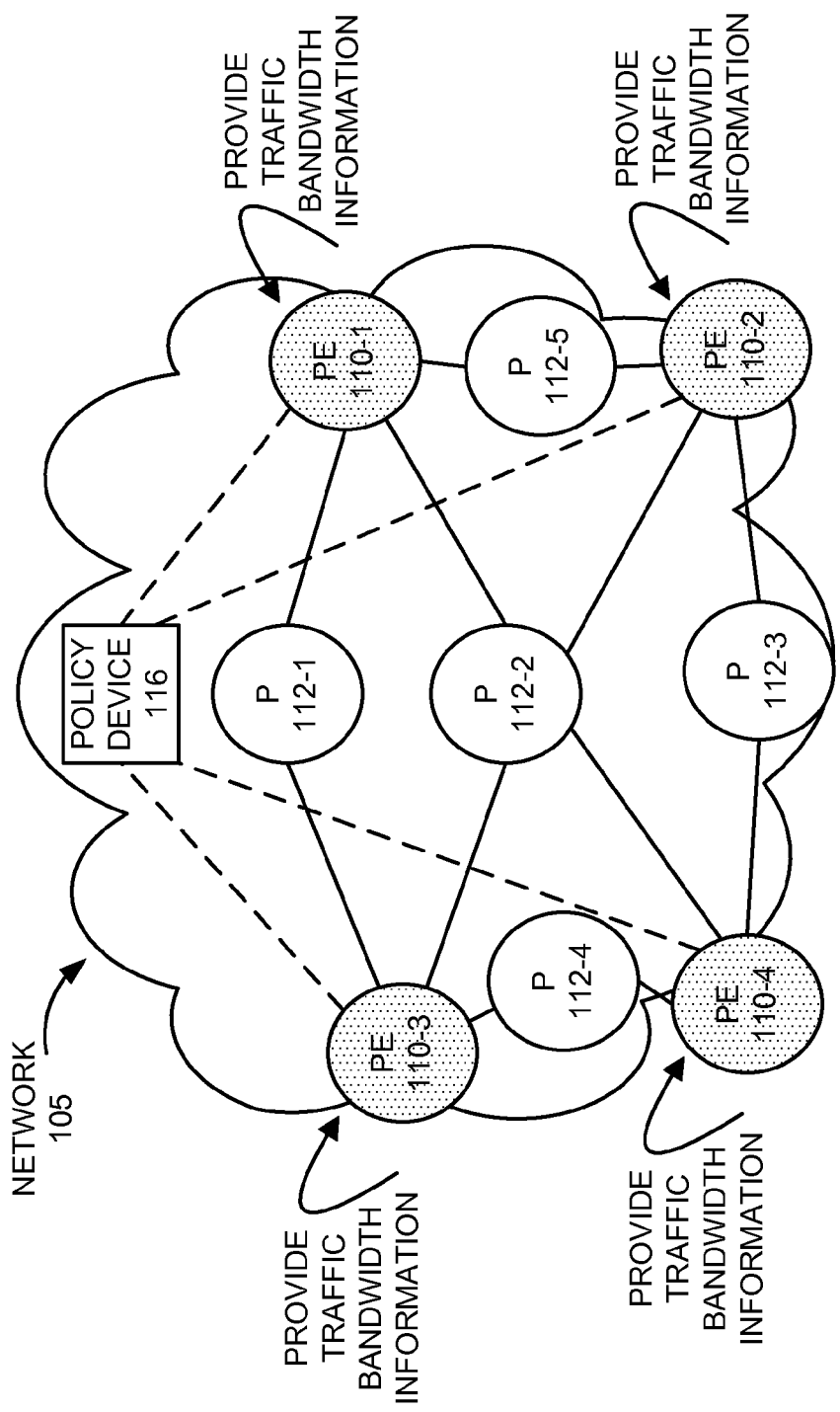

Referring to FIG. 2C, provider edge devices 110 provide the traffic bandwidth information to policy device 116. By way of example, the traffic bandwidth information is sent to policy device 116 via a BGP attribute or via some other protocol. The traffic bandwidth information includes, for example, destination information (e.g., a VPN, a provider edge device 110, a network address, etc.) and bandwidth use. Provider edge devices 110 may provide other types of information to policy device 116. For example, provider edge devices 110 may query Simple Network Management Protocol Management Information Base (SNMP MIB) variables to determine the traffic load based upon desired criteria. Also, provider edge devices 110 may gather information pertaining to specific applications, port numbers, and/or MAC addresses.

Figure 2D:
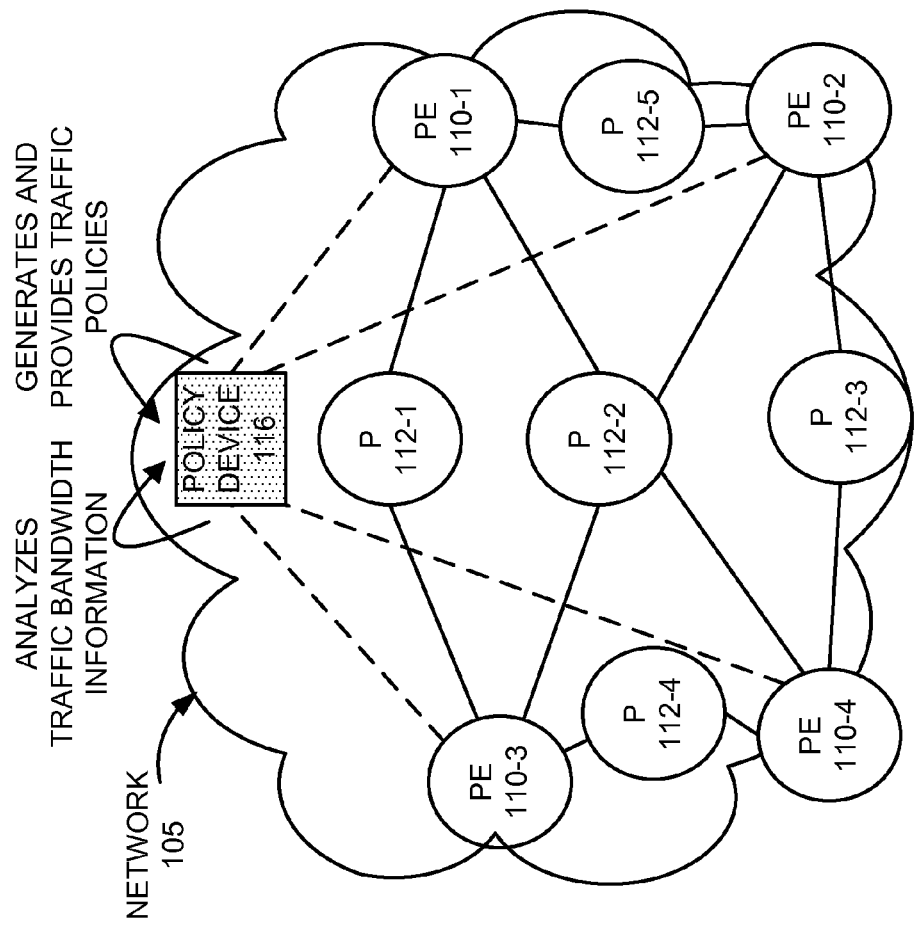

Referring to FIG. 2D, in response to receiving the traffic bandwidth information, policy device 116 analyzes the traffic bandwidth information. Based on the analysis, policy device 116 generates traffic policies. For example, policy device 116 assembles traffic parameters and determines the aggregate traffic flow toward a destination of interest, the protocol composition of the traffic flow, the application involved, and/or the burst history of the traffic flow. The history may be used to provide credits for compliant behavior and the deletion of credits for traffic flows exceeding established criteria. Policy device 116 generates a policing scheme that allows, for example, enforcement of a traffic flow (e.g., based upon a hard limit), allows oversubscription of a resource (e.g., based upon an overbooking factor), and/or invokes a time-of-day or other parameter by which to grant permission to the traffic flow being sent and in the appropriate traffic volume from provider edge devices 110. Additionally, for example, policy device 116 may be manually configured according to a network operator's policy decisions. The manual configuration may form a basis for policy device 116 to select policies to be carried out by the policy edge devices. Alternatively, policy device 116 may select policies, as described herein, based on the traffic bandwidth information.

Policy device 116 provides traffic policies to provider edge devices 110-1 through 110-4. By way of example, the traffic policies are sent to provider edge devices 110 via a BGP attribute or via some other protocol. The traffic policy information may include sets of data per destination (e.g., destination node, committed rate, burst rate, peak rate) or similar parameters than can enable provider edge devices 110 to generate traffic policies (e.g., 2R3C policing, 1R2C policing, simple rate limiting, traffic or packet dropping, and/or other well-known policing practices (e.g., described in RFCs 2697, 2698, 4115, etc)) in an appropriate syntax or the traffic policy information may already be in a suitable syntax to allow provider edge devices 110 to enforce the traffic policies. According to another embodiment, policy device 116 may be configured by a network operator of network 105 to set traffic policy information, which may be sent to provider edge devices 110.

Figure 2E:
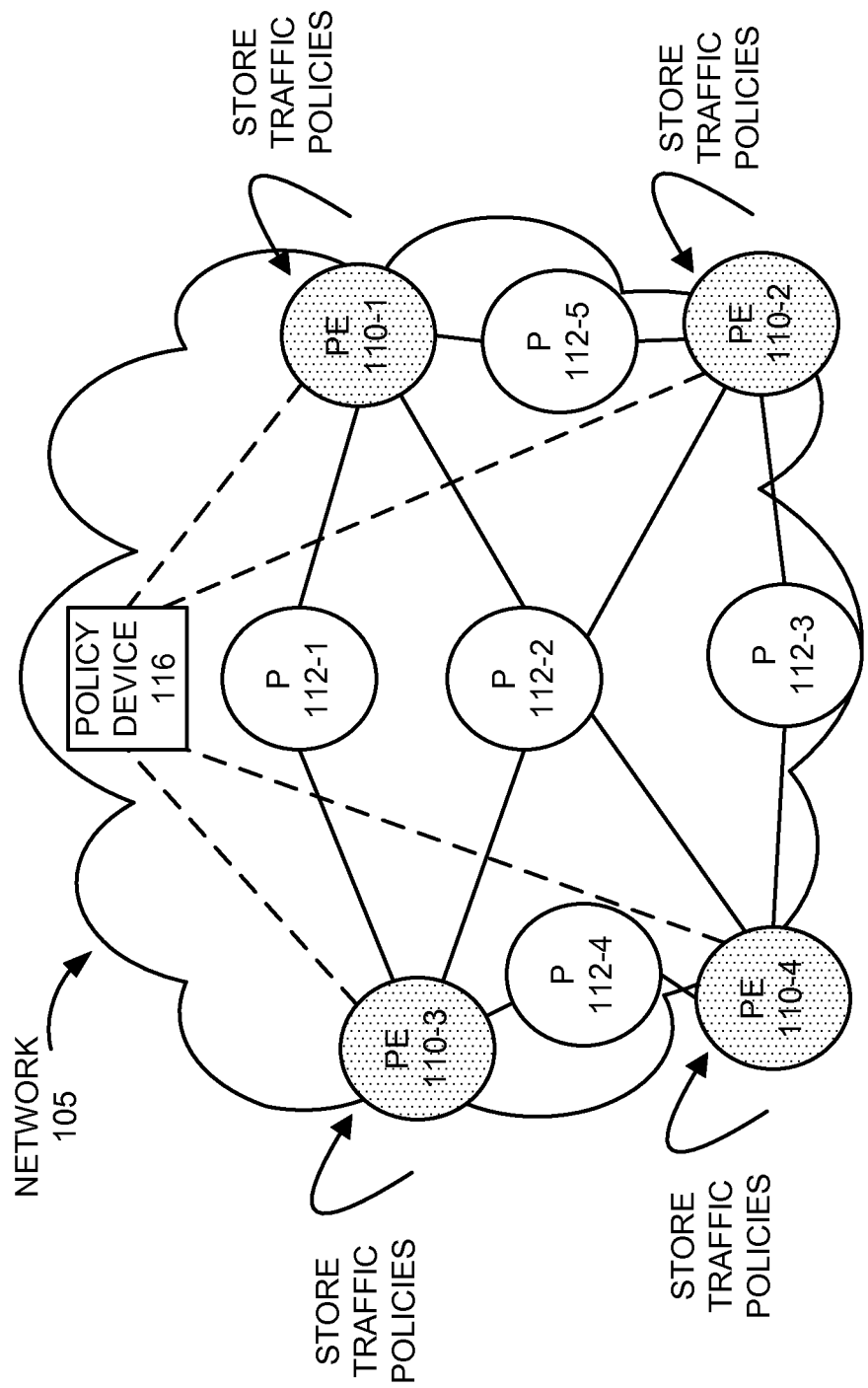
Figure 5:
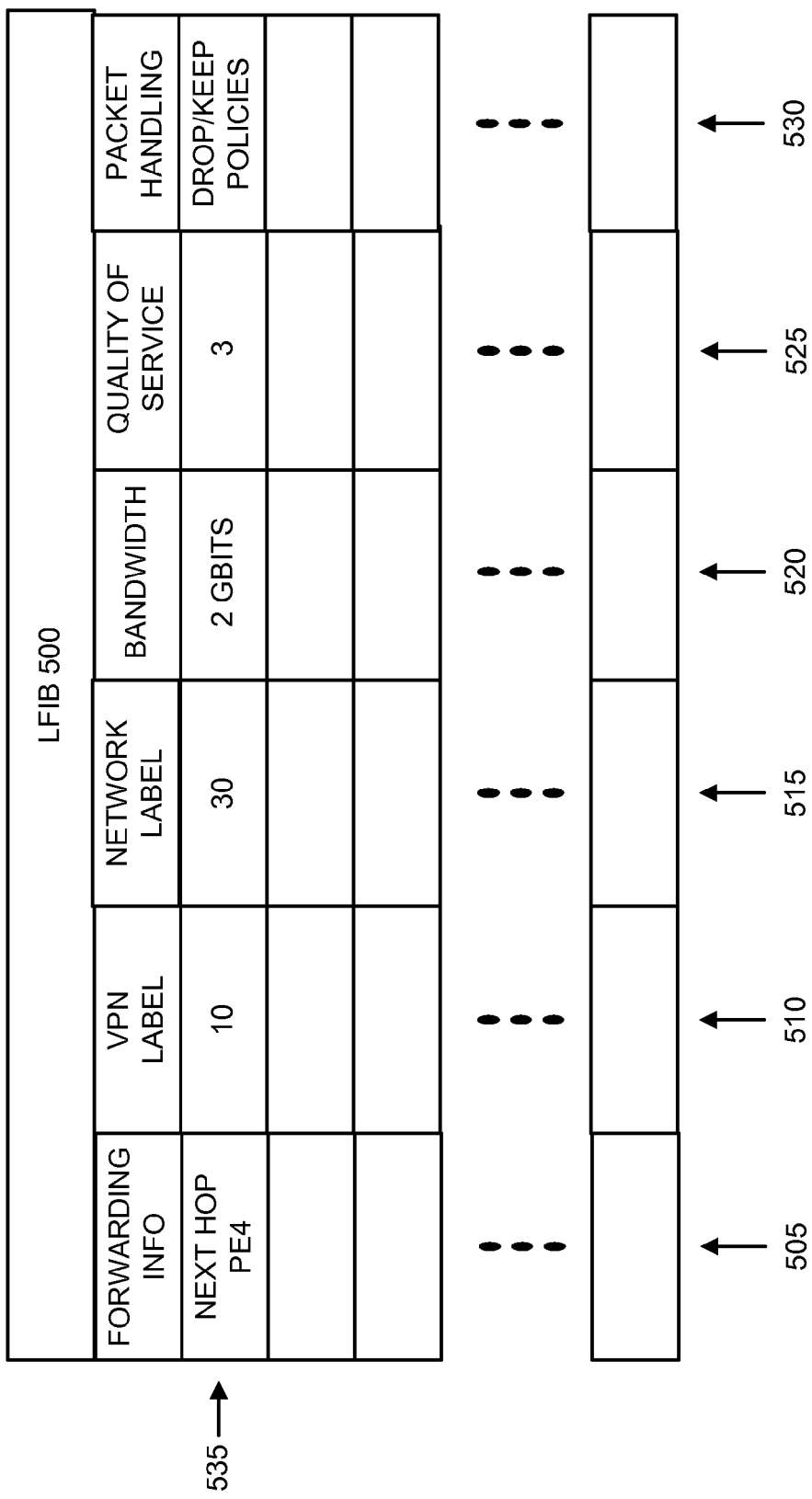
FIG. 5 is a diagram illustrating an exemplary Label Forwarding Information Base.

Referring to FIG. 2E, provider edge devices 110 receive the traffic policy information and store the traffic policy information. According to an exemplary implementation, the traffic policy information is stored in an LFIB. FIG. 5 is a diagram illustrating an exemplary LFIB 500. As illustrated, LFIB 500 includes a forwarding information field 505, a VPN label field 510, a network label field 515, a bandwidth field 520, a Quality of Service field 525, and a packet handling field 530. For example, forwarding information field 505 includes routing information to route packets to a destination; VPN label field 510 includes VPN information (e.g., a VPN identifier); network label field 515 includes network information (e.g., a network identifier); bandwidth field 520 includes bandwidth information (e.g., a bandwidth); Quality of Service field 525 includes quality of service information (e.g., a quality of service identifier, a quality of service level, etc.); and packet handling field 530 that includes packet handling policies. For example, the packet handling policies pertain to dropping and keeping packets in relation to a 1R2C framework. According to other implementations, packet handling field 530 includes other packet handling policies that are applicable to other policies (e.g., 2R3C, etc.), as previously described. As illustrated, an entry 535 includes a mapping of the fields included in LFIB 500 and allows provider edge device 110 to correlate labels (e.g., a VPN label, a network label) with traffic policies (e.g., QoS, bandwidth, etc.).

The bandwidth allowed for a destination may be allocated to a packet, a traffic flow, etc., based on a QoS indicator included in a packet or associated with a traffic flow. The quality of service information included in Quality of Service field 525 may correlate with the allocated bandwidth indicated in bandwidth field 520. For example, as illustrated in FIG. 5, entry 530 pertains to packets destined to provider edge device (4), with VPN labels=4 and network labels=30, in which these packets are allocated a bandwidth of 2 Gigabits and a QoS=3. Although not illustrated in FIG. 5, other entries may allocate a bandwidth that prevents a packet or a traffic flow from reaching a destination. For example, bandwidth field 520 may indicate a bandwidth of zero due to security reasons, etc. Other reasons may exist for imposing bandwidth restrictions, such as, for example, a destination or a set of destinations lie at the end of a trunk with limited bandwidth, a destination or a set of destinations are restricted due to political concerns and must not be reached or reached on a limited basis, or a destination or a set of destinations are sensitive due to policy reasons, etc.

Figure 2F:
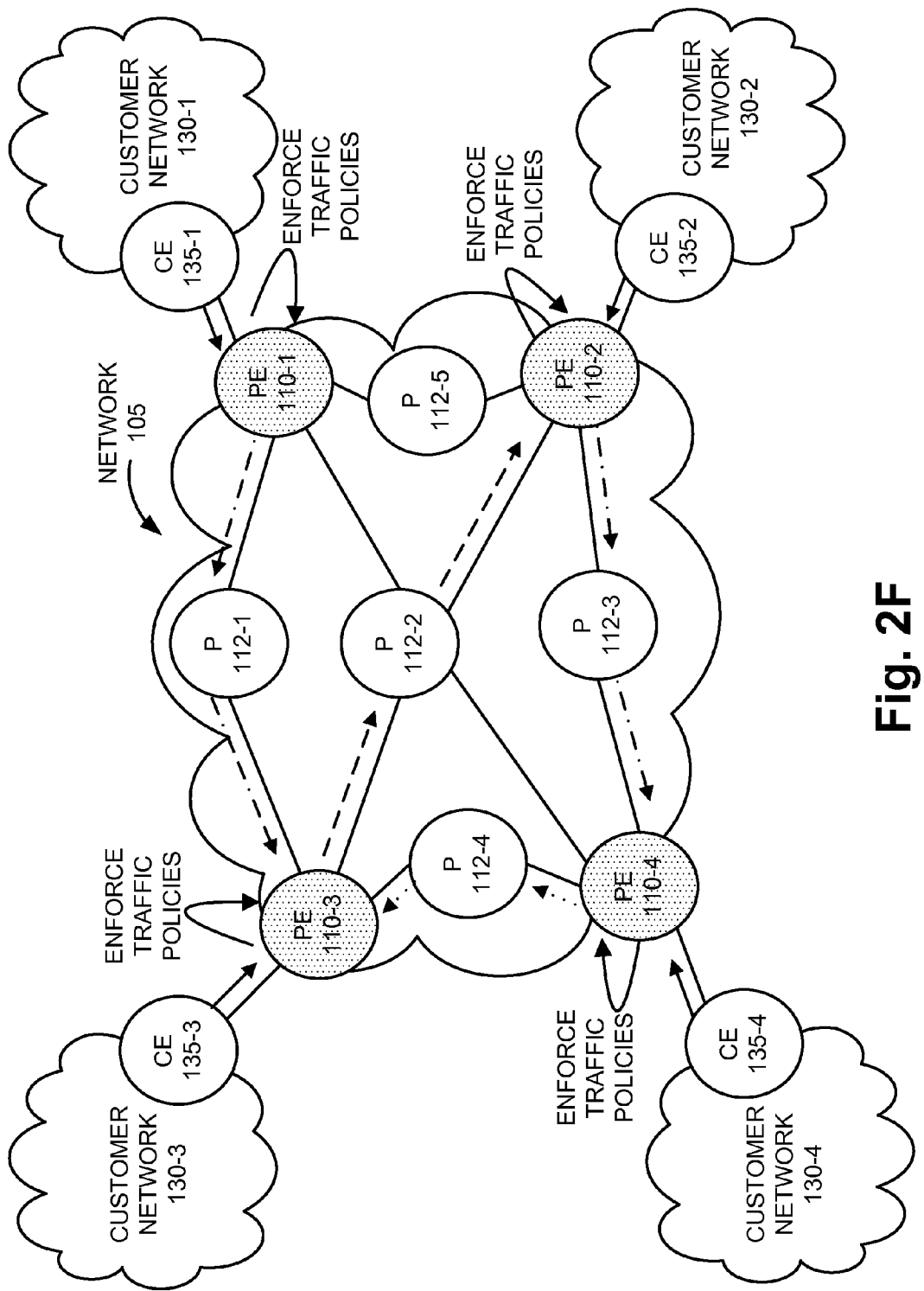

Referring to FIG. 2F, provider edge devices 110 enforce the traffic policies relative to traffic received. For example, provider edge devices 110 use the traffic policy information stored in LFIB 500 to enforce traffic policies pertaining to traffic traversing network 105.

Figure 4A:
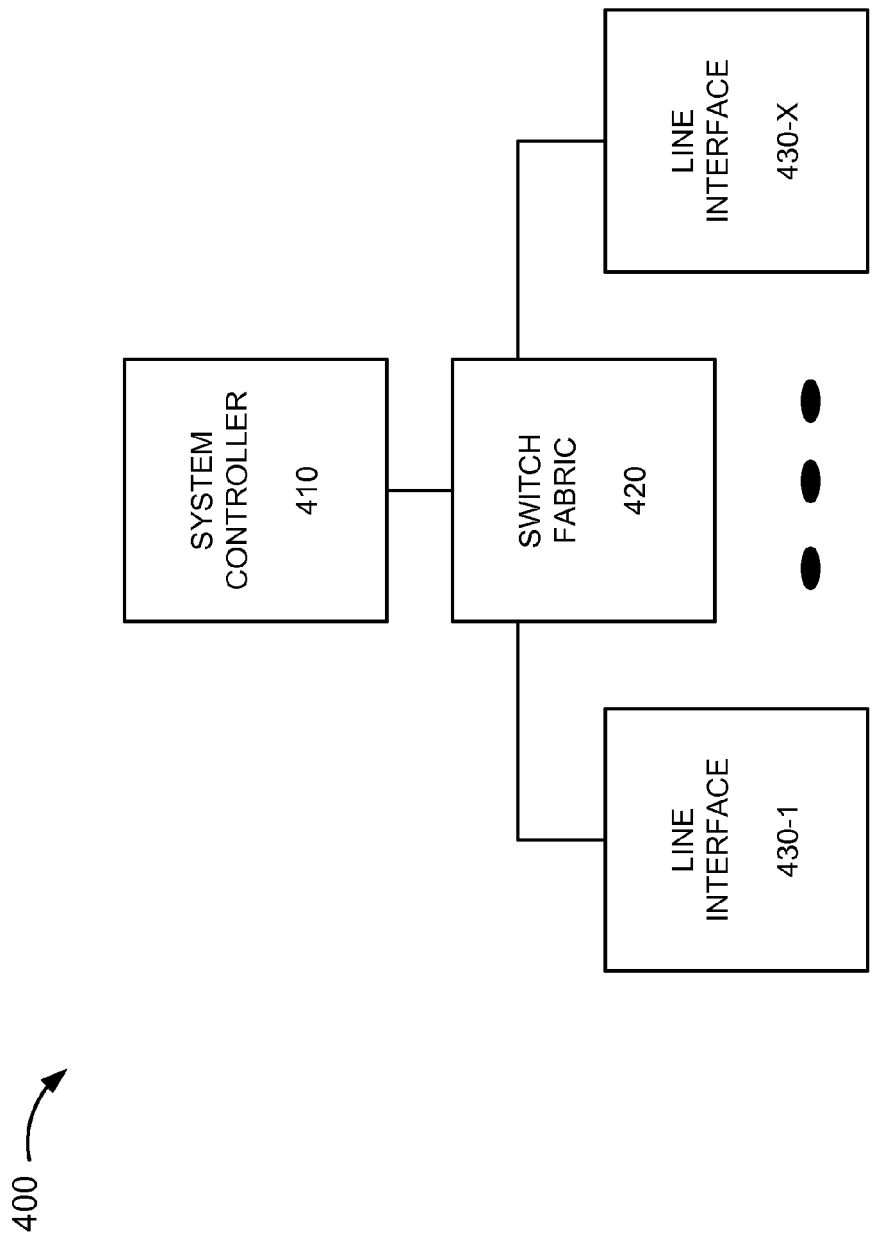
FIG. 4A is a diagram illustrating exemplary components of a network device that may correspond to one or more of the devices depicted in the exemplary environment depicted in FIG. 1.

FIG. 4A is a diagram illustrating exemplary components of a network device 400 that may correspond to one or more of the devices in environment 100. For example, provider edge devices 110 and provider devices 112 may be implemented according to the components illustrated and described in FIGS. 4A and 4B. As illustrated, network device 400 includes a system controller 410, a switch fabric 420, and line interfaces 430-1 through 430-X, in which X>1 (also referred to collectively as line interfaces 430 or individually as line interface 430). According to other embodiments, device 400 may include fewer components, additional components, different components, and/or a different arrangement of components than those illustrated in FIG. 4A and described herein.

System controller 410 includes one or multiple processors, microprocessors, application specific integrated circuits (ASICs), field programming gate arrays (FPGAs), and/or processing logic that may be optimized for networking and communications. System controller 410 may also include one or multiple static memories (e.g. read only memory (ROM)), one or multiple dynamic memories (e.g. random access memory (RAM)), one or multiple onboard caches and/or flash memories for storing data and/or machine-readable instructions.

System controller 410 may perform high level management functions for network device 400. For example, system controller 410 may communicate with other networks, devices, and/or systems connected to network device 400 to exchange information regarding network topology. System controller 410 may also include a routing engine.

Switch fabric 420 include one or multiple switching planes to facilitate communication among line interfaces 430 and/or system controller 410. According to an exemplary implementation, a switching plane includes a single-stage switch or a multi-stage switch of crossbar elements. Switch fabric 420 may also, or alternatively, include one or more processors, one or more memories, and/or one or more paths that permit communication among system controller 410 and line interfaces 430.

Line interfaces 430 include devices or components, such as, for example, line cards, for receiving incoming packets from network links (or from other line interfaces 430) and for transmitting packets to network links (or to other line interfaces 430). Line interfaces 430 manage a set of input ports via which packets may be received and a set of output ports via which packets may be transmitted. Line interfaces 430 may include one or more processors, one or more memories, and/or other forms of logic and/or hardware.

According to an exemplary embodiment, network device 400 performs traffic flow distribution processes pertaining to routing and/or switching of traffic flows, as described herein. According to an exemplary implementation, network device 400 performs one or more operations of a process in response to system controller 410 and/or line interface(s) 430 executing instructions (e.g., software, microinstructions, etc.). Alternatively, according to another exemplary implementation, network device 400 performs one or more operations of a process based on hardware processing.

Figure 4B:
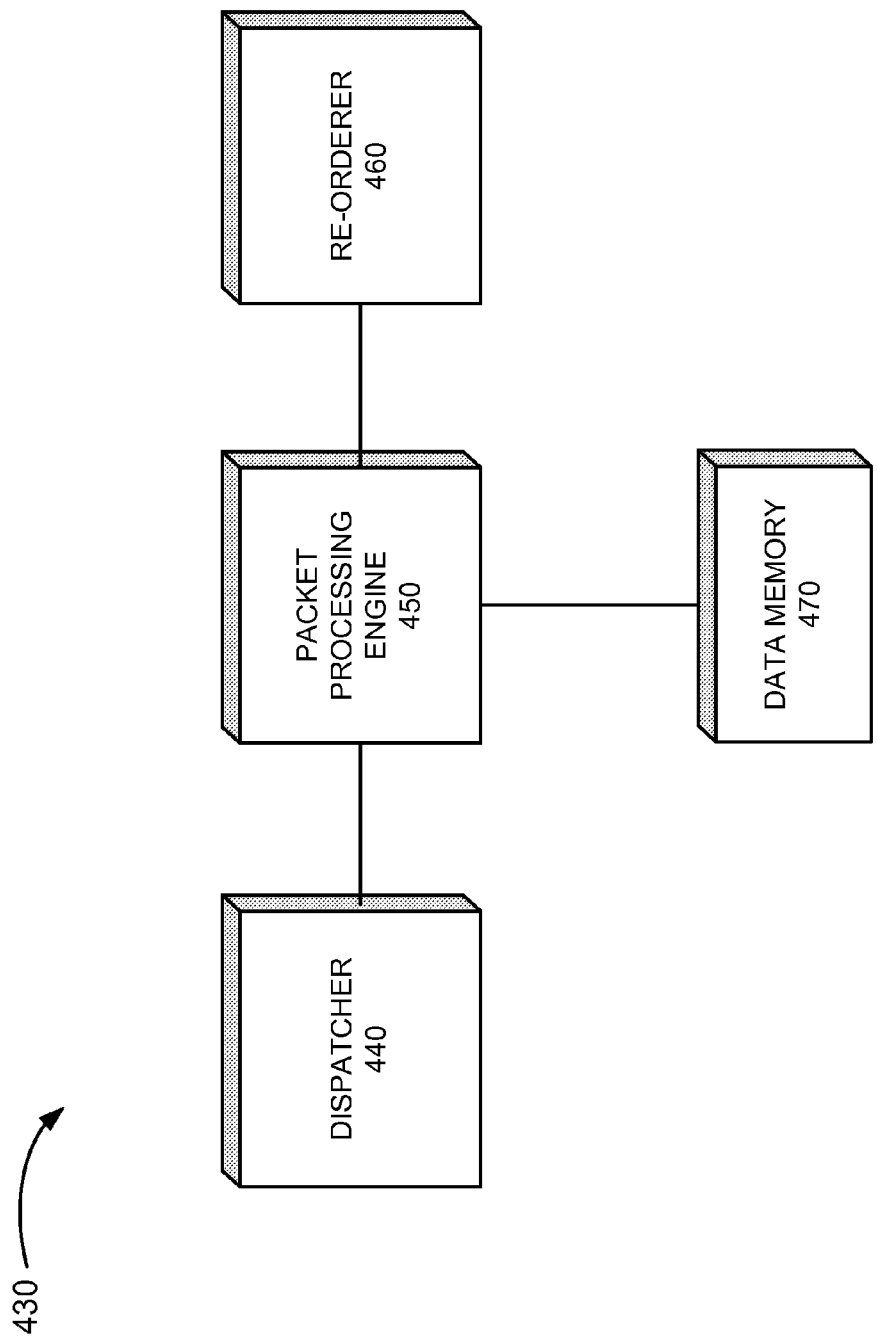
FIG. 4B is a diagram illustrating exemplary functional components of a line interface of the network device depicted in FIG. 4A.

FIG. 4B is a diagram illustrating exemplary functional components of line interface 430 depicted in FIG. 4A. The functional components illustrated in FIG. 4B may be implemented by hardware (e.g., one or more processors or other processing logic) or a combination of hardware and software. As illustrated, line interface 430 may include a dispatcher 440, a packet processing engine (PPE) 450, a re-orderer 460, and a data memory 470.

Dispatcher 440 may serve packets to packet processing engine 450. Dispatcher 440 may store the packets in a memory associated with packet processing engine 450. Dispatcher 440 may receive an indication (e.g., a signal) from re-orderer 460 that packets have been processed by packet processing engine 450. Dispatcher 440 may re-utilize resources for other incoming packets based on this indication.

Packet processing engine 450 may provide for input processing, route lookup, and output processing of packets. Packet processing engine 450 may use data memory 470 to perform routing lookups, classification of packets (e.g., for security purposes), policy-based routing, quality of service (QoS) routing, filtering of packets, and other forms of packet processing (e.g., packet statistical processing, accounting, and/or encapsulation). Packet processing engine 450 may perform one or more packet processing operations (e.g., packet parsing, route lookup, packet rewriting, and/or firewall determinations, etc.) based on microinstructions. The microinstructions may be generated by compiling source code for an application or part of an operating system (OS), such as, for example, Juniper Operating System (JUNOS), Cisco Internet Operating System (IOS), etc. Packet processing engine 450 may execute the microinstructions in one or more processes or threads.

Re-orderer 460 may retrieve packets from a memory associated with packet processing engine 450 when packet processing engine processes are completed. Re-orderer 460 may manage the ordering of the packets when the packets are associated with a same traffic flow. Re-orderer 460 may pass the packets for output by network device 400.

Data memory 470 may store various types of data related to packet processing. For example, data memory 470 may store a forwarding information base (FIB), routing policies, etc. Data memory 470 may be implemented as, for example, a cache memory or other type of high-speed access memory or non-transitory storage medium.

Although FIG. 4B illustrates exemplary functional components of an exemplary line interface 430, according to other implementations, line interface 430 may include fewer functional components, additional functional components, and/or different functional components than those depicted in FIG. 4B and described herein. Additionally, or alternatively, one or more functional components of line interface 430 may perform one or more other tasks described as being performed by one or more other functional components of line interface 430. Additionally, dispatcher 440, packet processing engine 450, re-orderer 460, and/or data memory 470 may be implemented in a component other than line interface 430.

Figure 6:
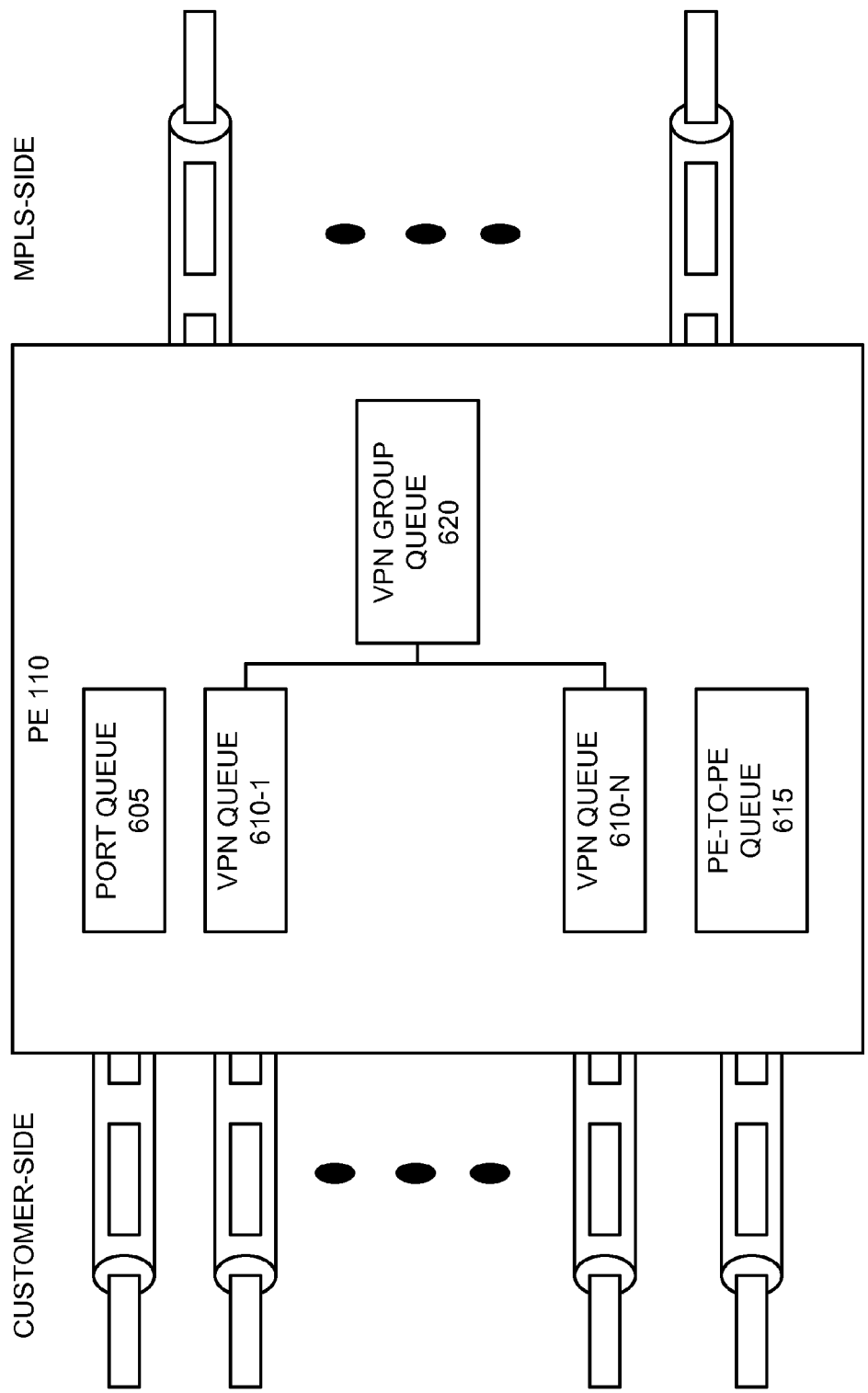
FIG. 6 is a diagram illustrating an exemplary queue system.

FIG. 6 is a diagram illustrating an exemplary queue system. For example, as previously described, nodes in the MPLS-based network (e.g., provider edge device 110) include various types of queues. These queues may be implemented to support the management and enforcement of traffic policies, as described herein. According to an exemplary implementation, the queues illustrated and described herein may be implemented in line interface 430. According to other implementations, the queues may be implemented by other components of provider edge device 110.

Referring to FIG. 6 and with reference to provider edge device 110, as packets are received from a customer side, these packets may be stored in various types of queues. For example, provider edge device 110 may include a port queue

605, VPN queues 610-1 through 610-N, in which N>1 (also referred to individually as VPN queue 610 and VPN queues 610), a PE-to-PE queue 615, and a VPN group queue 620. The number and type of queues are merely exemplary. According to other implementations, provider edge device 110 may include a different number of queues, a different configuration of queues, and/or different types of queues. For example, provider edge device 110 may include a group of PE-to-PE queues, etc.

Port queue 605 stores packets pertaining to a particular port. VPN queue 610 stores packets pertaining to a particular VPN. PE-to-PE queue stores packets pertaining to a particular provider edge device 110 (e.g., a next-hop provider edge device 110, a destination provider edge device 110, etc.). VPN group queue 620 stores packets pertaining to a group of VPNs.

According to an exemplary implementation, a queue may be used to store packets received from a customer side. According to another implementation, a queue may be used to store packets to be transmitted to an MPLS-side. As previously described, a queue may be implemented in a cascaded manner (e.g., hierarchical fashion) or in a multilayer manner (e.g., the queue acts independently relative to other queues). For example, VPN queues 610 and VPN group queue 620 illustrate a cascade of queues. Also, PE-to-PE queue 615 and port queue 605 illustrate multilayer queues. Traffic policies may be applied in a multilayer fashion or a cascaded fashion in correspondence to the queues.

According to an exemplary implementation, a particular type of queue may be used as a filtering system to apply traffic policies. By way of example, packets received by VPN queue 610-1, which are destined to a particular VPN, may be subject to the same traffic policies. That is, the queuing of packets in VPN queue 610-1 may facilitate the processing of the packets as such processing pertains to traffic policing. According to other exemplary implementations, provider edge device 110 may apply traffic policies to traffic flows without queues for the customer-side and/or the MPLS-side.

Figure 7:
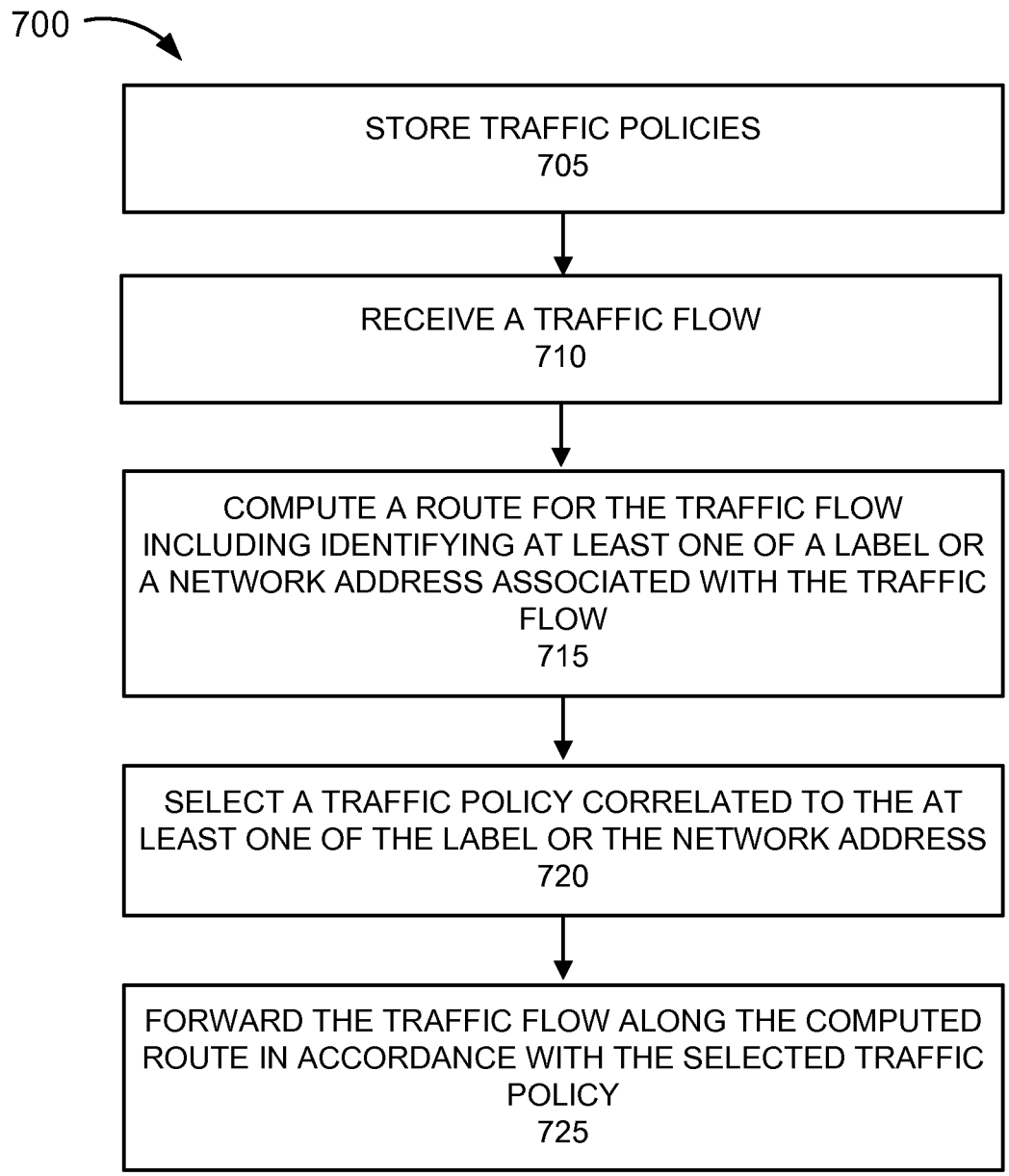
FIG. 7 is a flow diagram illustrating an exemplary process pertaining to an exemplary embodiment of traffic policing for an MPLS-based network.

FIG. 7 is a flow diagram illustrating an exemplary process pertaining to an exemplary embodiment of traffic policing for an MPLS-based network. According to an exemplary embodiment, provider edge device 110 performs process 700. For example, system controller 410 and/or line interface 430 of provider edge device 110 execute(s) one or more of the steps described.

Process 700 begins with storing traffic policies (block 705). For example, provider edge device 110 stores a data structure or a database that includes traffic policies. According to an exemplary implementation, provider edge device 110 stores an LFIB (e.g., LFIB 500). The traffic policies may include 2R3C policing, 1R2C policing, simple rate limiting, traffic or packet dropping, and/or other well-known policing practices (e.g., described in RFCs 2697, 2698, 4115, etc.).

In block 710, a traffic flow is received. For example, provider edge device 110 receives a traffic flow from customer edge device 135.

In block 715, a route for the traffic flow is computed including identifying at least one of a label or a network address associated with the traffic flow. For example, provider edge device 110 computes a route for the traffic flow based on the destination associated with the traffic flow and a routing algorithm, such as a shortest-path first (SPF) algorithm (e.g., Dijkstra's algorithm) or other routing algorithm (e.g., a minimum interference routing algorithm (MIRA), a profile-based routing algorithm, an open shortest-path first (OPSF) algorithm, a dynamic online routing algorithm (DORA), etc.). Additionally, provider edge device 110 identifies one or multiple labels included in the packets (e.g., a network label 310, a VPN label 315, a combination thereof), a destination address (e.g., a destination IP address), and/or a next-hop address or provider edge device 110 (e.g., an IP address).

In block 720, a traffic policy is correlated to the at least one of the label or the network address and selected for use. For example, based on the identifying, provider edge device 110 correlates the traffic flow (e.g., the packets) with the appropriate traffic policy stored in the data structure or the database, such as LFIB 500. According to an exemplary implementation, the traffic policy includes an allowable bandwidth.

In block 725, the traffic flow is forwarded along the computed route in accordance with the selected traffic policy. For example, provider edge device 110 transmits the traffic flow to network 105 based on the selected traffic policy. By way of example, the traffic policy includes an allotted bandwidth.

Although FIG. 7 illustrates an exemplary process 700 pertaining to traffic policing in an MPLS-based network, according to other embodiments, process 700 may include additional operations, fewer operations, and/or different operations than those illustrated in FIG. 7 and described herein.

Figure 8:
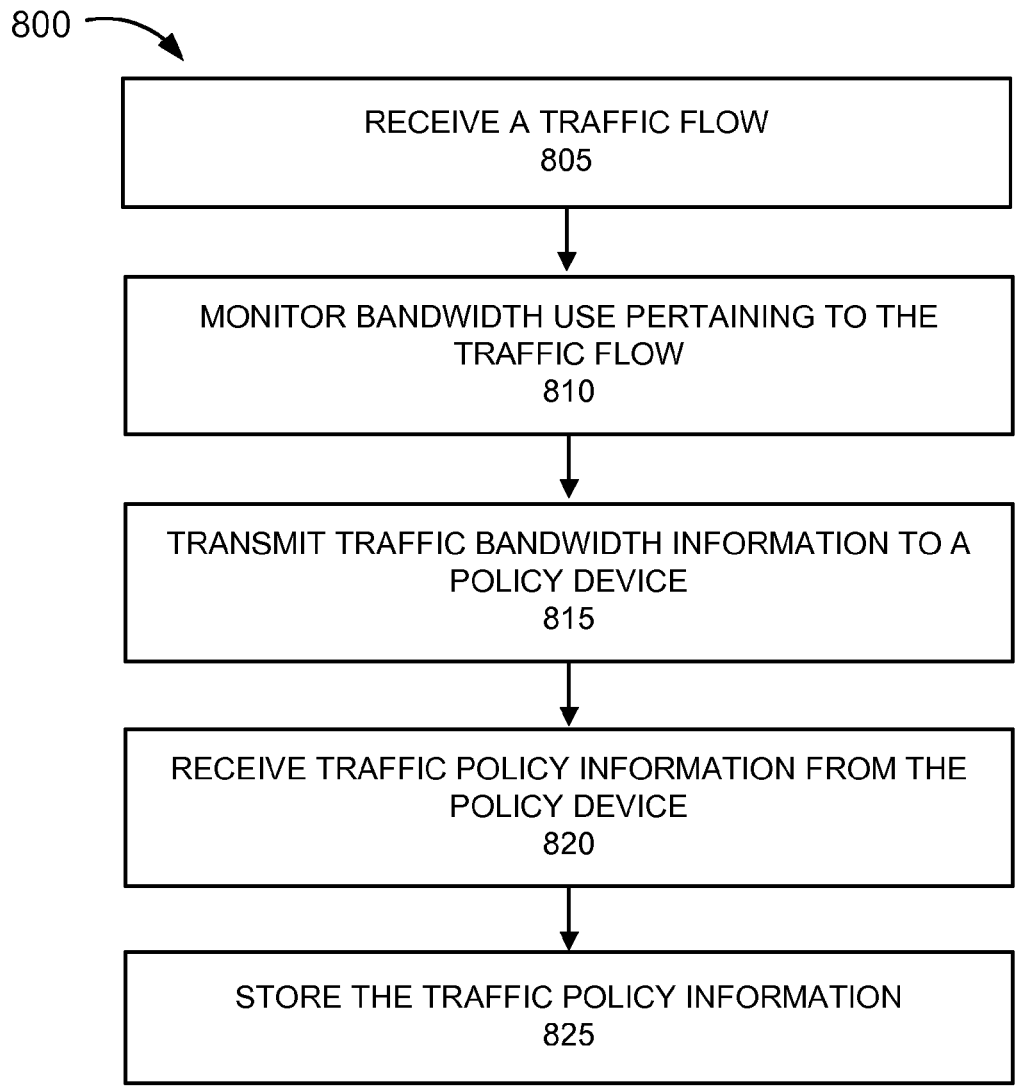
FIG. 8 is a flow diagram illustrating another exemplary process pertaining to an exemplary embodiment of traffic policing for an MPLS-based network.

FIG. 8 is a flow diagram illustrating another exemplary process pertaining to an exemplary embodiment of traffic policing for an MPLS-based network. According to an exemplary embodiment, provider edge device 110 performs process 800. For example, system controller 410 and/or line interface 430 of provider edge device 110 execute(s) one or more of the steps described.

Process 800 begins with receiving a traffic flow (block 805). For example, provider edge device 110 receives a traffic flow from customer edge device 135.

In block 810, bandwidth use pertaining to the traffic flow is monitored. For example, provider edge device 110-1 determines the active traffic bandwidth (e.g., the bandwidth being used) of a path to a destination node by the traffic flow. Provider edge device 110-1 routes the traffic flow to the destination and collects statistical information pertaining to the current traffic flow using a label switching path. The statistical information includes or allows provider edge device 110-1 to derive a current bandwidth utilization. By way of example, provider edge device 110-1 samples for a time period (e.g., t0 to t1) the number of bits or bytes transmitted via one or more interfaces.

In block 815, traffic bandwidth information is transmitted to a policy device. For example, provider edge device 110 transmits traffic bandwidth information to policy device 116.

In block 820, traffic policy information is received from the policy device. For example, provider edge device 110 receives traffic policy information from policy device 116.

In block 825, the traffic policy information is stored. For example, provider edge device 110 stores the traffic policy information in an LFIB (e.g., LFIB 500). Provider edge device 110 enforces the traffic policies based on the data and/or information included in the LFIB, as described herein.

Although FIG. 8 illustrates an exemplary process 800 pertaining to traffic policing in an MPLS-based network, according to other embodiments, process 800 may include additional operations, fewer operations, and/or different operations than those illustrated in FIG. 8 and described herein. The periodicity or frequency associated with process 800 may be a configurable parameter set by a network operator. For example, process 800 and/or one or more steps of process 800, may be performed in a periodic manner, an aperiodic manner, a continuous manner, a proactive manner, a reactive manner, etc.

Figure 9:
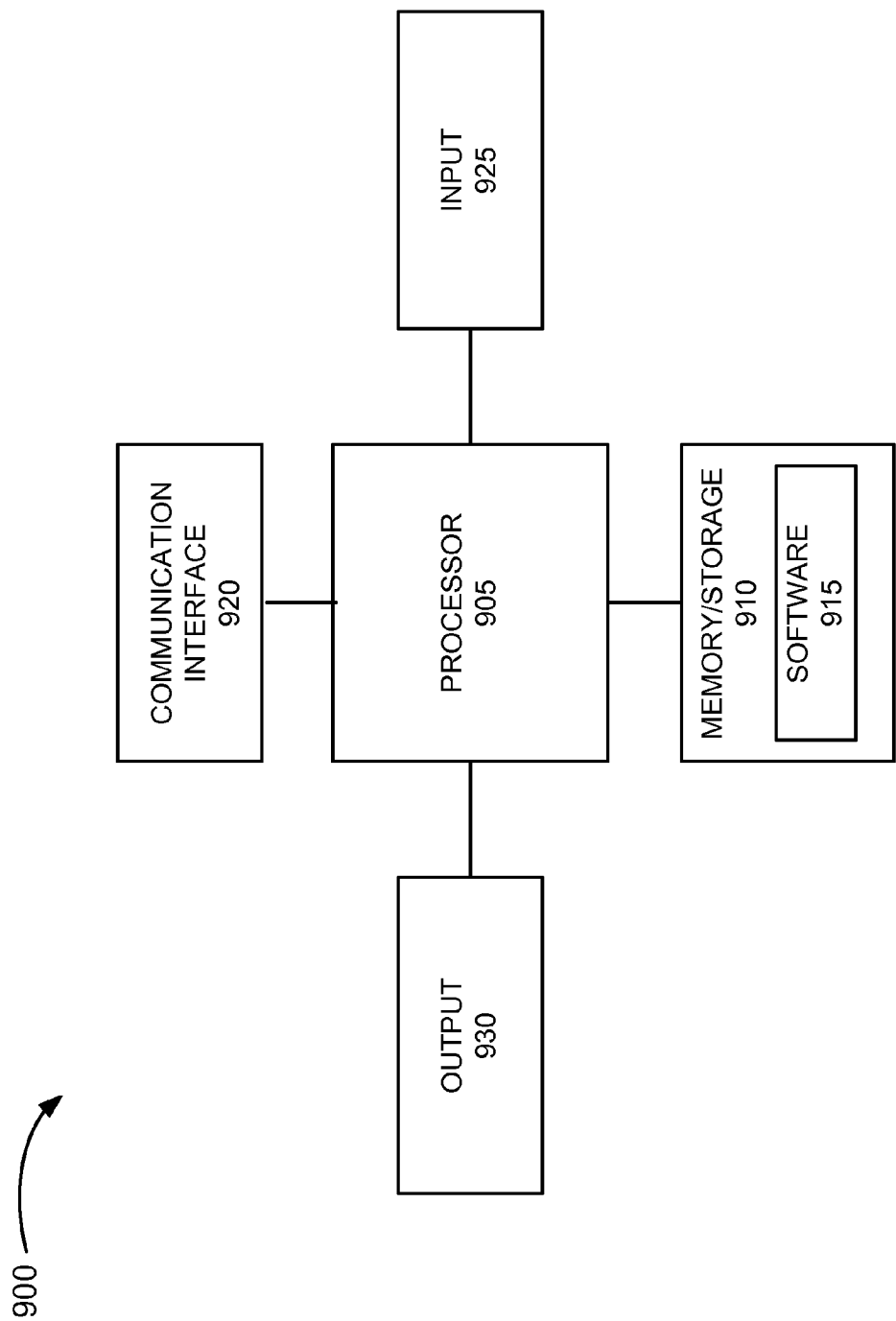
FIG. 9 is a diagram illustrating exemplary components of a policy device illustrated in the figures.

FIG. 9 is a diagram illustrating exemplary components of a device 900 that may correspond to one or more of the devices in environment 100. For example, policy device 116 may be implemented according to the components illustrated and described in FIG. 9. As illustrated, according to an exemplary embodiment, device 900 may include a processor 905, memory/storage 910 including software 915, a communication interface 920, an input 925, and an output 930. According to other embodiments, device 900 may include fewer components, additional components, different components, and/or a different arrangement of components than those illustrated in FIG. 9 and described herein.

Processor 905 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 905 may be implemented as hardware (e.g., a microprocessor, etc.), a combination of hardware and software (e.g., a SoC, an ASIC, etc.), may include one or multiple memories (e.g., memory/storage 910), etc.

Processor 905 may control the overall operation or a portion of operation(s) performed by device 900. Processor 905 may perform one or multiple operations based on an operating system and/or software (e.g., software 915). Processor 905 may access instructions from memory/storage 910, from other components of device 900, and/or from a source external to device 900 (e.g., a network, another device, etc.).

Memory/storage 910 includes one or multiple memories and/or one or multiple other types of storage mediums. For example, memory/storage 910 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 910 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 910 may include drives for reading from and writing to the storage medium.

Memory/storage 910 may be external to and/or removable from device 900, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 910 may store data, software, and/or instructions related to the operation of device 900.

Software 915 includes an application or a program that provides one or multiple functions or processes. Software 915 may include various forms of firmware (e.g., microcode, data, machine code, etc.).

Communication interface 920 permits device 900 to communicate with other devices, networks, systems, etc. Communication interface 920 may include one or multiple wireless interfaces and/or wired interfaces. Communication interface 920 may include one or multiple transmitters, receivers, and/or transceivers. Communication interface 920 may operate according to one or multiple protocols, standards, and/or the like.

Input 925 permits an input into device 900. For example, input 925 may include a keyboard, a mouse, a display, a touchscreen, a touchless screen, a button, a switch, an input port, speech recognition logic, and/or some other type of visual, auditory, tactile, etc., input component. Output 930 permits an output from device 900. For example, output 930 may include a speaker, a display, a touchscreen, a touchless screen, a light, an output port, and/or some other type of visual, auditory, tactile, etc., output component.

Device 900 may perform a process(es) and/or a function(s), as described herein, in response to processor 905 executing instructions (e.g., software 915) stored by memory/storage 910. By way of example, instructions may be read into memory/storage 910 from another memory/storage 910 or from another device via communication interface 920. The instructions stored by memory/storage 910 may cause processor 905 to perform a process or a function, as described herein. Alternatively, for example, according to other implementations, device 900 may perform a process or a function based on the execution of hardware (processor 905, etc.), the execution of firmware with hardware, or the execution of software and firmware with hardware.

The foregoing description of embodiments provides illustration, but is not intended to be exhaustive or to limit the embodiments to the precise form disclosed. Accordingly, modifications to the embodiments described herein may be possible. By way of example, one or more of the processes described herein may be implemented by provider devices 112. Additionally, as previously described, an embodiment may be implemented in a network other than an MPLS-based network, such as, a PBB-TE-based network, a GMPLS-based network, or a Q-in-Q-based network.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks is described with regard to the processes illustrated in FIGS. 7 and 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware, a combination of hardware and software, a combination of hardware and firmware, or a combination of hardware, firmware, and software. The embodiments have been described without reference to the specific software code since software can be designed to implement the embodiments based on the description herein.

Additionally, an embodiment described herein may be implemented as a non-transitory storage medium that stores data and/or information, such as instructions, program code, data structures, program modules, an application, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising: storing, by a network device, traffic policies pertaining to a label-based network, wherein the traffic policies include color-aware traffic policies and the traffic policies are mapped to one or more types of labels of the label-based network, wherein the one or more labels include at least one of a virtual private network label or a network label; using a cascaded queuing system that filters traffic flows pertaining to a particular set of the traffic policies, wherein the cascaded queuing system includes different queues corresponding to different labels of the label-based network, which are designated for the particular set of the traffic policies;
   receiving, by the network device, a traffic flow;
   computing, by the network device, a route for the traffic flow;
   identifying, by the network device, one or more labels associated with the traffic flow;
   selecting, by the network device, one or more of the traffic policies in response to the identifying of the one or more labels; and
   transmitting, by the network device, the traffic flow along the route in the label-based network according to the selected one or more of the traffic policies.

2. The method of claim 1, wherein the traffic policies are responsive to current bandwidth usage.

3. The method of claim 1, further comprising:
   receiving at least one other traffic flow;
   monitoring a bandwidth use pertaining to the at least one other traffic flow; and
   transmitting traffic bandwidth information, which includes the bandwidth use, to a traffic policy device.

4. The method of claim 3, further comprising:
   receiving, by the network device, one or more traffic policies from the traffic policy device; and
   enforcing the one or more traffic policies on one or more traffic flows having a same destination as the at least one other traffic flow.

5. The method of claim 3, further comprising:
   receiving, by the traffic policy device, the traffic bandwidth information;
   analyzing the traffic bandwidth information;
   selecting one or more traffic policies to be applied to a traffic flow having a same destination as the at least one other traffic flow; and
   transmitting the one or more traffic policies to the network device.

6. The method of claim 5, wherein the one or more traffic policies include an allowable bandwidth and the storing comprises:
   storing the traffic policies in a Label Forwarding Information Base.

7. The method of claim 1, wherein the network device includes a provider edge device, and the method further comprising:
   identifying a network address associated with a remote provider edge device along the route; and
   selecting one or more of the traffic policies in response to the identifying of the network address.

8. A device comprising:
   line interfaces;
   a memory; and
   logic configured to:
      store traffic policies pertaining to a label-based network, wherein the traffic policies include color-aware traffic policies and the traffic policies are mapped to one or more types of labels of the label-based network, wherein the one or more labels include at least one of a virtual private network label or a network label, wherein the color-aware traffic policies are generated responsive to current bandwidth usage;
      receive, via one of the line interfaces, a traffic flow;
      determine a route for the traffic flow;
      identify one or more labels associated with the traffic flow;
      select one or more of the traffic policies based on an identification of the one or more labels; and
      transmit, via another one of the line interfaces, the traffic flow along the route in the label-based network according to the one or more of the traffic policies.

9. The device of claim 8, further comprising:
   at least one of a cascaded queuing system or a multilayer queuing system in which the traffic policies are applied based on the at least one of the cascaded queuing system or the multilayer queuing system, and wherein the least one of the cascaded queuing system or the multilayer queuing system includes queues corresponding to labels of the label-based network.

10. The device of claim 8, wherein the logic is further configured to:
   receive, via one of the line interfaces, at least one other traffic flow;
   monitor a bandwidth use pertaining to the least other traffic flow; and
   transmit, via one of the line interfaces, traffic bandwidth information to a traffic policy device.

11. The device of claim 10, wherein the logic is further configured to:
   receive, via one of the line interfaces, one or more traffic policies from the traffic policy device; and
   enforce the one or more traffic policies on one or more traffic flows having a same destination as the at least one other traffic flow.

12. The device of claim 11, further comprising:
   at least one of a virtual private network queue, a provider edge device-to-provider edge device queue, or a group virtual private network queue.

13. The device of claim 11, wherein the logic is further configured to:
   identify a network address associated with a remote device along the route; and
   select the one or more traffic policies based on an identification of the network address.

14. The device of claim 8, wherein the logic is further configured to:
- store the traffic policies in a Label Forwarding Information Base.

15. The device of claim 8, wherein the device is a provider edge router.

16. A non-transitory storage medium storing instructions executable by a provider edge device to:
- store traffic policies pertaining to egress traffic to a label-based network, wherein the traffic policies include color-aware traffic policies and the traffic policies are mapped to one or more types of labels of the label-based network, wherein the one or more labels include at least one of a virtual private network label or a network label;
- use a cascaded queuing system that filters traffic flows pertaining to a particular set of the traffic policies, wherein the cascaded queuing system includes different queues corresponding to different labels of the label-based network, which are designated for the particular set of the traffic policies;
- receive a traffic flow;
- compute a route for the traffic flow;
- identify at least one of one or more labels associated with the traffic flow or a network address associated with a remote provider edge device associated with the traffic flow;
- select one or more of the traffic policies based on at least an identification of the one or more labels; and
- transmit the traffic flow along the route in the network according to the selected one or more of the traffic policies.

17. The non-transitory storage medium of claim 16, wherein the network includes a Multi-Protocol Label Switching network.

18. A method comprising:
- storing, by a network edge device, traffic policies pertaining to a label-based network, wherein the traffic policies correlate to one or more label types of the label-based network which are included in packets of traffic flows, wherein the one or more labels include at least one of a virtual private network label or a network label;
- using a cascaded queuing system that filters traffic flows from different virtual private networks that pertain to a same set of traffic policies, wherein the cascaded queuing system includes a virtual private network queue that cascades to a virtual private network group queue;
- receiving, by the network edge device, a traffic flow in a queue designated for at least one of the traffic policies;
- identifying, by the network edge device, one or more labels associated with the traffic flow to be routed via the label-based network;
- selecting, by the network edge device, one or more traffic policies based on the identifying of the one or more labels and the queue; and
- transmitting, by the network edge device, the traffic flow along a route in the label-based network according to the selected one or more of the traffic policies.

19. The method of claim 18, wherein the traffic policies are responsive to current bandwidth usage.

20. The method of claim 18, wherein the one or more traffic policies include an allowable bandwidth and the storing comprises:
- storing the traffic policies in a Label Forwarding Information Base.

21. The method of claim 18, further comprising:
- identifying a network address associated with a remote network device along the route; and
- selecting one or more of the traffic policies based on the identifying of the network address.

* * * * *